(12) United States Patent
Kenez et al.

(10) Patent No.: US 7,766,777 B2
(45) Date of Patent: Aug. 3, 2010

(54) DEVICE FOR SUPERIMPOSING ROTATIONAL SPEEDS, COMPRISING A SERVODRIVE

(75) Inventors: Peter Kenez, Budapest (HU); Gerhard Waibel, Bildstein (AT); Rene Allgauer, Altach (AT)

(73) Assignee: Thyssenkrupp Presta AG, Eschen (LI)

( * ) Notice: Subject to any disclaimer, the term of this patent is extended or adjusted under 35 U.S.C. 154(b) by 656 days.

(21) Appl. No.: 11/722,477

(22) PCT Filed: Oct. 6, 2005

(86) PCT No.: PCT/CH2005/000588

§ 371 (c)(1),
(2), (4) Date: Jun. 21, 2007

(87) PCT Pub. No.: WO2006/072186

PCT Pub. Date: Jul. 13, 2006

(65) Prior Publication Data

US 2010/0016116 A1   Jan. 21, 2010

(30) Foreign Application Priority Data

Jan. 6, 2005   (CH)   .................................   0015/05

(51) Int. Cl.
*F16H 3/72*   (2006.01)
(52) U.S. Cl. ............. 475/4; 475/149; 475/336
(58) Field of Classification Search .......... 475/4, 475/9, 336, 149
See application file for complete search history.

(56) References Cited

U.S. PATENT DOCUMENTS

| 2,165,453 | A | * | 7/1939 | Chilton et al. | 92/72 |
| 2,370,580 | A | * | 2/1945 | Pyne et al. | 475/4 |
| 2,481,477 | A | * | 9/1949 | Peery | 74/89.26 |
| 4,660,669 | A | * | 4/1987 | Shimizu | 180/444 |
| 7,041,022 | B2 | * | 5/2006 | Bock et al. | 475/7 |
| 2004/0067809 | A1 | * | 4/2004 | Hoersch et al. | 475/4 |
| 2005/0173184 | A1 | * | 8/2005 | Kojima et al. | 180/444 |
| 2008/0116002 | A1 | * | 5/2008 | Jungbecker et al. | 180/444 |

* cited by examiner

*Primary Examiner*—David D Le
*Assistant Examiner*—Erin D Bishop
(74) *Attorney, Agent, or Firm*—Notaro, Michalos & Zaccaria P.C.

(57) ABSTRACT

Disclosed is a device for superimposing rotational speeds in a vehicle steering system. Said device comprises an input shaft (1) and an output shaft (2) that are arranged in a longitudinal direction relative to each other, a support system (IIa, IIb) which is fixed to the vehicle body and in which the input shaft (1) and the output shaft (2) are rotatably positioned so as to be mounted at least in part, a servodrive (6, 7) encompassing a stator (7) that is located on the support system (IIa, IIb) and a rotor (6) that is mounted so as to be rotatable parallel to the axis of the input shaft. The input shaft (1) is connected to a first toothed disk (3) while the output shaft (2) is joined to a second toothed disk (4). At least one additional toothed wheel (5) is mounted on the rotor (6) at a distance from the axis of rotation of the rotor (6) so as to be rotatable about its own axis around the input shaft (1). The toothing of said additional toothed wheel (5) engages into both toothings of the first and second toothed disk (3, 4).

21 Claims, 10 Drawing Sheets

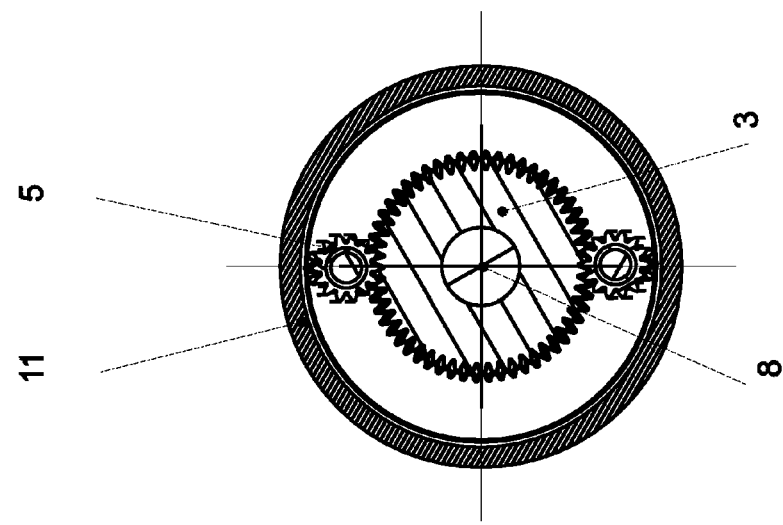
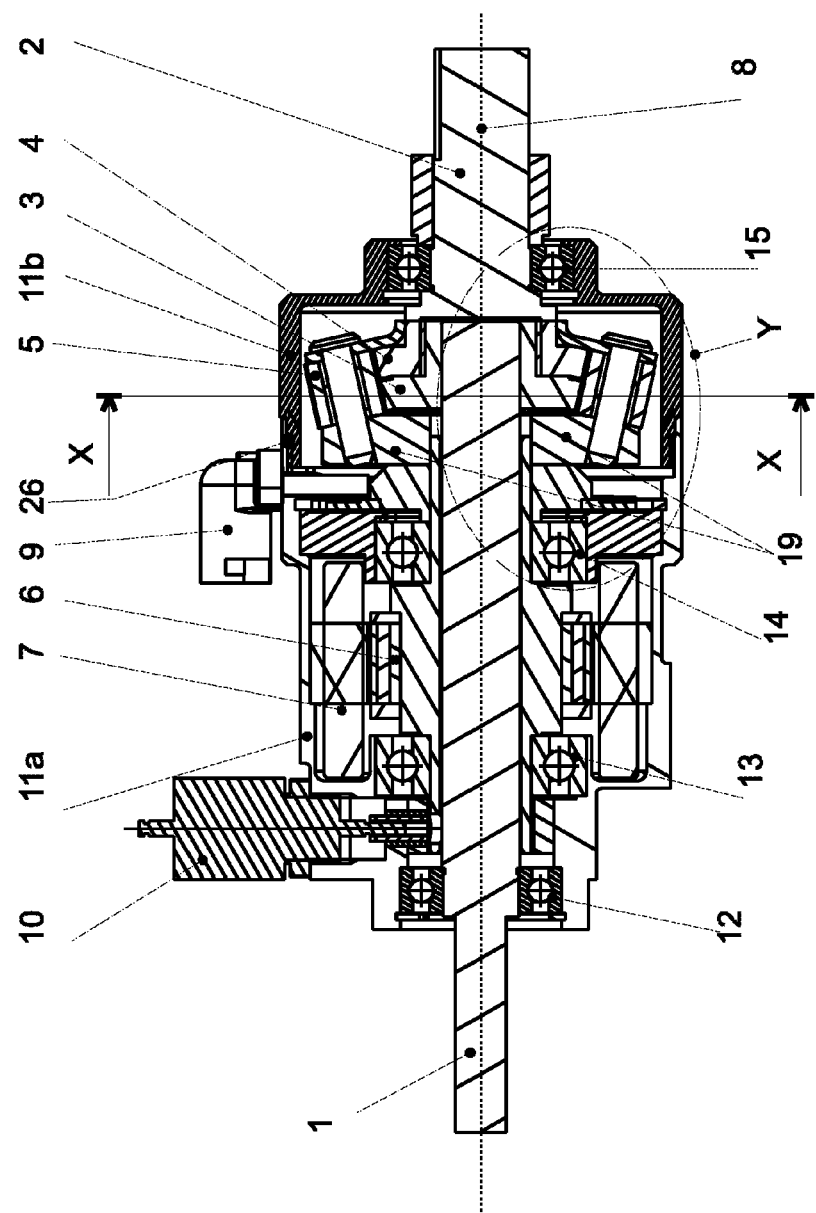
Fig. 3
Fig. 2

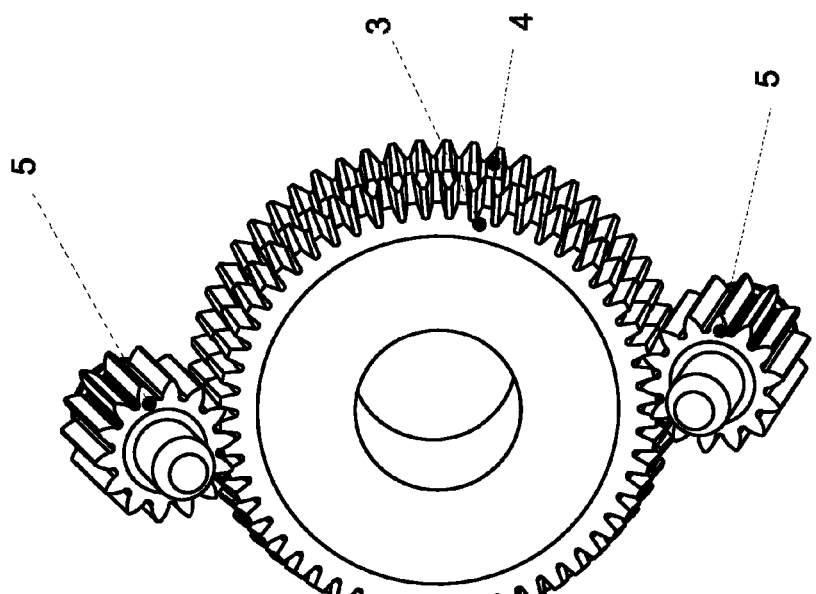
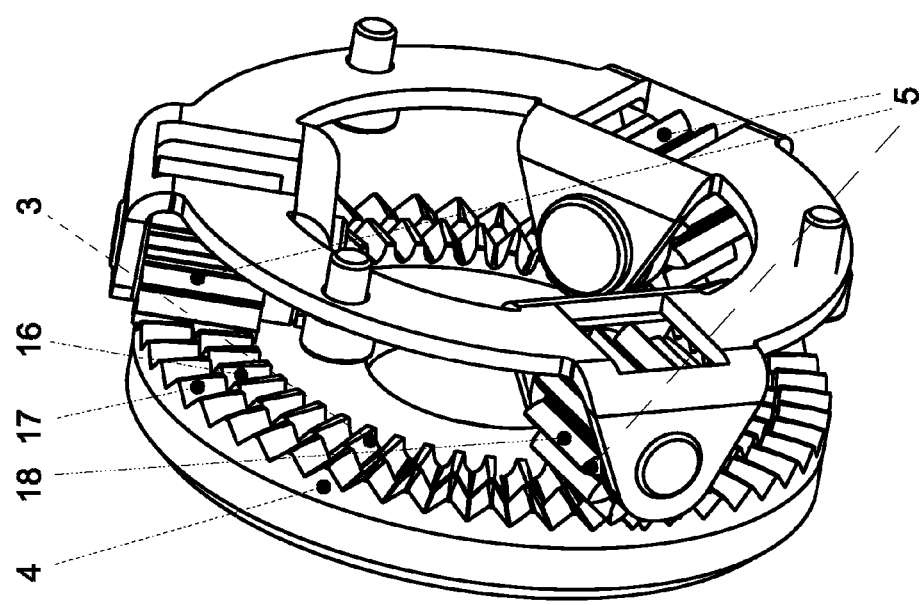
Fig. 8
Fig. 7

DEVICE FOR SUPERIMPOSING ROTATIONAL SPEEDS, COMPRISING A SERVODRIVE

FIELD AND BACKGROUND OF THE INVENTION

The invention relates to a device for superimposing rotational speeds, with an input shaft (1) and an output shaft (2) disposed in the longitudinal direction with respect to one another, a carrier system (11a, 11b) disposed stationarily on the vehicle body, in which the input shaft (1) and the output shaft (2) are positioned rotatably such that they are at least partially bearing supported and with an auxiliary drive (6, 7) with a stator (7) disposed on the carrier system (11a, 11b) and with a rotor rotatably bearing-supported axially parallel with the input shaft (1).

The invention relates in particular to a rotational speed superposition device with auxiliary drive for a steering system for free-riding or non-trackbound motor vehicles which superimposes the rotational speeds of the auxiliary drive and of the steering interventions on the steering wheel by the driver and transfers them to the steering movements of the wheels.

Such rotational speed superposition devices are also referred to in prior art, to the extent they are applied for steering systems, as rotational angle superimposing devices. Rotational speed superposition or rotational angle superposition are synonyms.

Within prior art a number of such systems is known, wherein the rotational superposition gearing is realized by a planetary gearing or also by a worm wheel gearing.

DE 19 823 721 A1 introduces such a rotational speed superposition device. Through a steering wheel a housing is here driven in which toothings of an internal gear wheel of two planetary gearings are located. An electric motor disposed in the housing drives the sun wheel of the first planetary gearing. The planet carrier of the first planetary gearing drives the sun wheel of the second planetary gearing. The planets of the second planetary gearing are supported on the internal gear wheel of the housing and the planet carrier is connected with the output shaft. In the depicted embodiment the driving of the sun wheel of the first planetary gearing is realized directly through the rotor of the electric motor. Through an appropriate actuation of the electric motor, the desired rotational speed superpositions can be produced. However, this solution shown in prior art entails some decisive disadvantages. Such gearings are comprised of a large number of structural parts. Two internal crown gear wheels or planetary gearings are necessary. The production of the parts is highly complex and expensive. The large number of tooth engagements leads to very high requirements made of the precision in order to avoid play. The entire device, including the motor housing, must further be rotated by the driver when steering. Moreover, a further disadvantage lies in the complex coupling-in of the electric energy for the electric motor.

In further prior art, DE 19 852 447 A1, a solution is introduced for the superposition of rotational speed in which an electric motor is coupled via a worm drive gearing, implemented as a planetary gearing, to the superposition gearing. The gearing unit is here disposed stationarily on the vehicle body. However, this solution also entails a number of disadvantages. The coupling via a worm gearing leads to very low efficiency of the rotational speed transmission. The arrangement furthermore requires considerable installation space, which is not very flexible due to the geometrically determined positions of the components relative to one another. The production of the parts is here also complex and expensive and the requirements made of the production tolerances correspondingly high.

SUMMARY OF THE INVENTION

The present invention addresses the problem of eliminating the disadvantages of prior art and simultaneously of providing a compact assembly, which permits the superimposing of rotational speeds with few structural parts which are as simple as possible in production. Further, the connection of the energy supply of the auxiliary drive as well as with the sensors utilized in the event they are needed, is simplified.

The problem is solved according to the invention through the rotational speed superposition. The invention also relates to preferred embodiments of the device for superimposing rotational speeds.

A superposition device for the rotational speed superposition is proposed which comprises:
 an input shaft and an output shaft disposed in the longitudinal direction with respect to one another,
 a carrier system disposed stationarily on the vehicle body in which the input shaft and the output shaft are rotationally positioned such that they are at least partially bearing-supported,
 an auxiliary drive with a stator disposed on the carrier system and with a preferably coaxially rotationally bearing-supported rotor axially parallel with the input shaft, characterized according to the invention in that the input shaft is connected torsion-tight with a first toothed disk, and that the output shaft is connected torsion-tight with a second toothed disk, and that on the rotor at least one further toothed wheel is disposed rotatably about its own axis and spaced apart from the rotational axis of the rotor rotatable about the input shaft, wherein the toothing of the further toothed wheel engages in both toothings of the first and of the second toothed disk.

Through the rotation of the further toothed wheel, rotatably supported on the rotor of the auxiliary drive on a circular path encircling the rotor axis, it simultaneously rolls off on both toothings of the two toothed disks and sets them so into motion that the tooth engagements between the toothings of the toothed wheel and of the two toothed disks are variable, and this capability of varying preferably if the tooth number and/or the reference circle diameter of the toothed disks are different. Through the suitable selection of the difference of the number of teeth of the toothed disks the transmission ratio can be predetermined.

The input shaft and the output shaft do not need to be implemented as the classic rod or tube-form shafts, they can also be implemented as solid structural parts with, for example, non-round shape, such as for example as articulation part or part of a ball screw or of other components. The driving and driven functions can also be exchanged against one another.

An especially simple and compact disposition is attained if the axes of the input shaft and of the output shaft are aligned. In this case both shafts are disposed successively in the same axis and, decoupled from one another, rotatably bearing supported. The two toothed disks are in this case advantageously disposed close and at the front end opposingly, whereby for the further toothed wheel the simultaneous engagement into both toothed disk is readily realizable.

The arrangement is especially preferably utilized in a steering system for a motor vehicle.

In the simplest case the entire superposition device is disposed in an axis, the rotational center of the device, and the toothings of the toothed disks are disposed with the tips of their teeth parallel to one another. The two toothings of the two toothed disks can have different reference circle diameters. In the preferred embodiment these tooth tips are directed away from the rotational center of the superposition device. In the especially preferred embodiment the toothings are oriented at an angle α greater than 0°, in particular in the range from 0 to 100°, to the orthogonal to the rotational center. The layout takes place with consideration of the inertia, the efficiency and the torque to be transmitted and the required transmission ratios among the involved gearing members. The one or the further toothed wheels are uniformly distributed over the circumference connected directly with the rotor of the auxiliary drive, for example via an auxiliary carrier, and oriented at an angle corresponding to the direction of the toothings of the two toothed disks, such that the toothings of the toothed wheels engage at their outer circumference the toothings of the two toothed disks.

A layout with a toothing angle of α greater than 90° offers the advantage of a self-centering of the system.

The two toothed disks have preferably a different tooth number such that, after one rotation of the rotor of the auxiliary drive, the two toothed disks are angularly shifted by the angle amounting to the difference of the tooth numbers of the two toothed disks. If the first toothed disk of the input unit is kept at a standstill, the toothed disk of the output unit rotates by this corresponding angle for each rotation of the rotor of the auxiliary drive. Therefrom a transmission ratio between the rotational speed of the rotor of the auxiliary drive and the rotational speed of the output unit can be determined, which in the following is referred to as transmission ratio of the superposition gearing.

For steering systems, transmission ratios in the range of 10:1 to 50:1 are frequently desired. This means, for example, that 50 revolutions of the rotor of the auxiliary drive are transmitted for one rotation of the output shaft.

The diameter of the entire device should simultaneously be kept to less than 100 mm. Therefrom result preferred angles α for the angling off of the toothings of the toothed disk with respect to the orthogonal to the rotational center of the superposition gearing in a first preferred range of approximately 10 to 30 angular degrees or alternatively, in a second preferred range of angles α of 60 to 100 angular degrees.

The carrier system, which is preferably implemented as a housing, is connected directly or indirectly with the chassis of the motor vehicle.

With the arrangement is attained that as long as the auxiliary drive is not set into motion or blocked against the carrier system, the rotational driving speed is transmitted directly via the first toothed disk, via the further toothed wheels into the second toothed disk and consequently onto the output unit. As soon as the auxiliary drive sets the further toothed wheels into rotation, the rotational speeds of the input unit and the rotational speed of the rotor, transmitted by the transmission ratio of the superposition gearing, are added together. It is in principle insignificant whether or not the rotation of the toothed wheels takes place through the rotation of the auxiliary carrier about its own axis, which preferably coincides with the rotational center of the rotational speed superposition device, or through the rotation of the toothed wheels about their own axis. The last case is more difficult to realize, however, could be of advantage for certain required rotational speed transmissions.

From the operating state of the motor vehicle, such as speed, road condition, desired steering wheel angle and further parameters, a control system can determine set points for a suitable rotational speed superposition and therefrom determine set points for the actuation of the auxiliary drive.

In the preferred embodiment the auxiliary drive is an electric motor. In particular, as electric motor a permanent magnet-excited synchronous motor, in which the stator with the exciting windings is fixedly connected with the carrier system of the device and the rotor is disposed coaxially in the interior.

However, it is also feasible to utilize the superposition device introduced in the present invention also using an hydraulic or pneumatic auxiliary drive instead of the electric motor. The power assisted drive can here be an orbit motor or a reversed vane pump.

Important advantages of the newly introduced technique comprise that the gearing is composed of fewer structural components as well as that the utilized toothed wheels and toothed disks are simpler in production than the toothed wheels for a planetary wheel gearing. The requirements made of the toothed wheels for the new technique are lower since the tolerance chain for the entire path of the rotational angle transmission is shorter. The components can be produced especially advantageously through forging, warm or cold, as well as in sinter technology.

In an advantageous further development of the invention into the superposition gearing a safety coupling or a circuit is integrated, which, in the event of error or special motor vehicle situations—such as for example power failure, failure of the control or switched-off ignition, etc.—forces a direct mechanical coupling between input and output shaft such that the driver maintains complete control over the steering system. The coupling can, for example, take place very simply through the blocking of the rotor of the auxiliary drive with respect to the stator or the housing of the device.

According to the introduced invention, the disposition of the superposition device between steering gearing and steering wheel as well as also between steering gearing and tie rod or in the steering gearing is feasible. The choice is made according the particular structural conditions of the installation space and according to other technical and commercial requirements. In the event the device is disposed between steering gearing and tie rod or in the steering gearing, as a rule, the output shaft is directly connected with a conversion gearing for the transmission of a rotational movement into a translational movement. A ball screw is, for example, directly driven here.

In alternative embodiments the electric motor is disposed parallel to the axis of the transmission gearing and is coupled via a spur gear or worm gear or belt or chain gearing to the transmission gearing.

The various features of novelty which characterize the invention are pointed out with particularity in the claims annexed to and forming a part of this disclosure and are entirely based on the Swiss priority application no. 15/05 filed Jan. 6, 2005.

BRIEF DESCRIPTION OF THE DRAWINGS

In the following the invention will be explained in further detail by example and with schematic figures for preferred embodiments. In the drawing depict:

FIG. 2 longitudinal section through a first preferred embodiment for a device for superimposing rotational speeds, FIG. 3 cross section along the section plane X-X in FIG. 2, FIG. 4 an enlarged segment Y from FIG. 2 with an illustration of the tooth meshing, FIG. 5 longitudinal section through an alternative embodiment with elastic compensation for play, FIG. 6 longitudinal section through an enlarged segment analogous to FIG. 4 for a further alternative embodiment, FIG. 7 three-dimensional view of the gearing unit of the superposition gearing according to the embodiment as shown in FIG. 6, FIG. 8 three-dimensional view of the gearing unit of the superposition gearing according to the embodiment as shown in FIG. 2, FIG. 9 an embodiment of the rotational speed superposition device with adjustable safety coupling in perspective representation, FIG. 10 rotational speed superposition device according to FIGS. 2 and 9 combined with an adjustable safety coupling in longitudinal section, FIG. 11 schematic illustration of another structure of the safety coupling.

Figure 1:
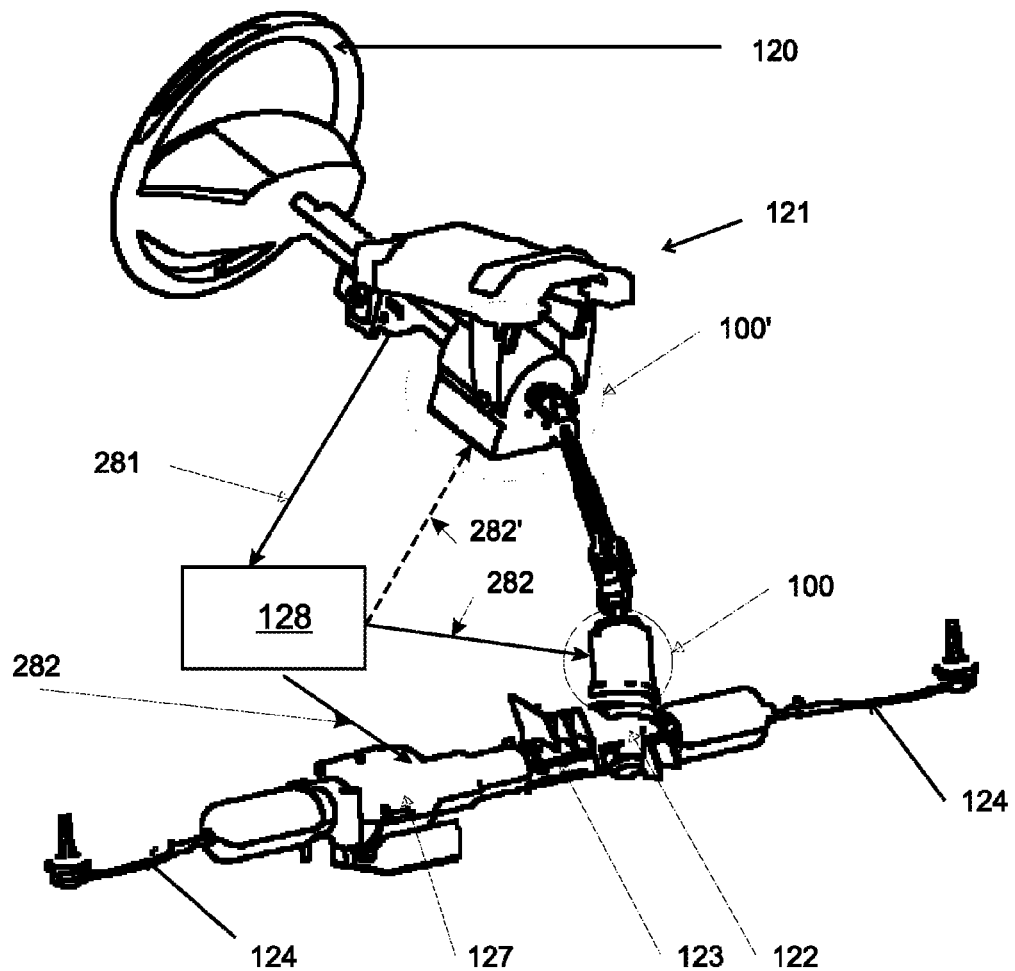
FIG. 1 schematic structure of a steering system with power assisted booster.

The schematic structure shown in FIG. 1 of a steering arrangement 129 as a steer-by-wire arrangement or steering arrangement 129 with electric power assisted booster corresponds substantially to prior art. It is comprised inter alia of a steering wheel 120, a steering column 121, the steering gearing 122 and the two tie rods 124. The tie rods 124 are driven by the toothed rack 123. For the rotational speed superposition serves the superposition device 100, 100' or 127 according to the invention or the superposition device integrated within the steering gearing 122.

Figure 4:
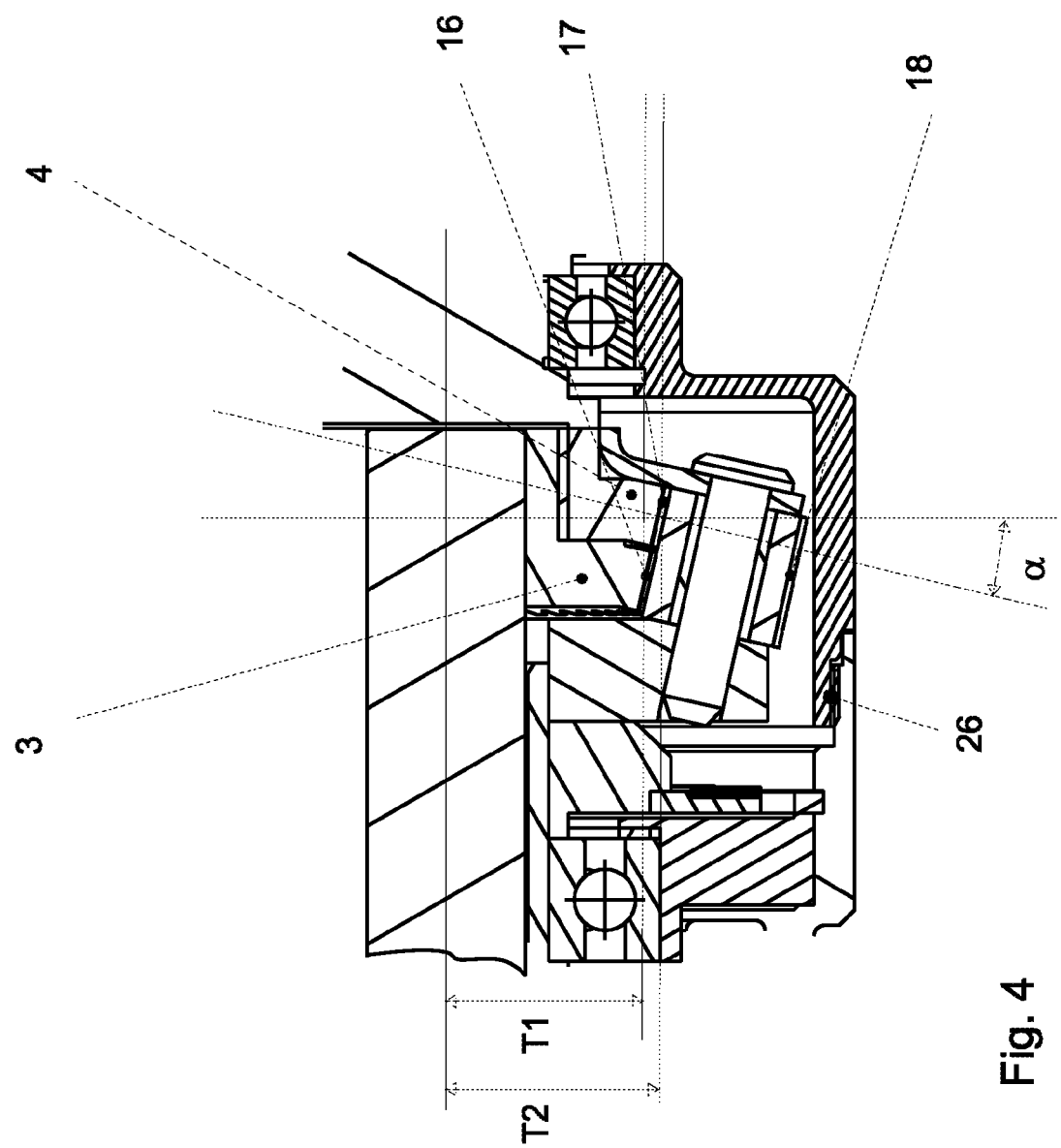

In the preferred embodiment the superposition device is located between steering wheel 120 and steering gearing 122, for example at the site labeled 100. In FIGS. 2 and 4 only this embodiment of the superposition gearing 100 is shown in greater detail.

In a further embodiment the superposition device is disposed between steering gearing 122 and tie rods 124 or in the steering gearing. The superposition device 127 includes in this case a conversion gearing, for example a ball screw, for the transmission of the rotational motion into a translational motion.

In all embodiments, the intention of the driver—in the normal case—is fed through the steering wheel 120 via a, not shown here, sensor system as signal 281 into a control apparatus 128. In the control apparatus 128 therefrom, optionally utilizing a sensor signal of the auxiliary drive of the steering system (signal line not shown here) and/or of the rotational speed superposition unit and further signals describing the motor vehicle state, is determined the appropriate control voltage 282 for the electric motor and output to the electric motor in the superposition device 100.

The invention relates to the superposition device 100 in the arrangement in a steering system 129 for a motor vehicle. The steering system can herein be laid out with or without power assisted booster. It is here irrelevant whether or not the possibly available power assisted booster of the steering system is hydraulic, pneumatic or electric.

The superposition device 100 comprises an input shaft 1, driven directly or indirectly by the steering wheel 120, an output shaft 2 driving directly or indirectly the tie rods, a carrier system 11a, 11b, an auxiliary drive, preferably an electric motor 6, 7, and two toothed disks 3, 4 as well as at least one further toothed wheel 5.

In conjunction with FIGS. 2 to 4 and 8 a preferred embodiment example of such a rotational speed superposition device is explained further.

In the embodiment depicted here the rotational speed superposition device comprises the following components:
- a driving device, here the input shaft 1,
- a driven device, here the output shaft 2,
- an auxiliary drive comprising a stator 7 with stator windings, not specifically shown here, with corresponding electrical connection and a rotor 6 with permanent magnets, not specifically shown here.
- a carrier system stationary on the vehicle body, advantageously implemented as a housing, such as for example comprising the at least two housing parts 11a and 11b, which bearing supports the shafts 1, 2 and the rotor 6 of the auxiliary drive in bearings 12, 15 and 13, 14, respectively, and supports the stator 7 of the auxiliary drive, these housing parts preferably being bolt-connectable with threadings 26,
- an auxiliary carrier 19 implemented integrally with the rotor 6 or only connected torsion-tight, depending on the embodiment, which bearing supports at least one further toothed wheel 5 and forms a first gearing member,
- a first toothed disk 3, disposed on the input shaft 1 at the driving side, which disk comprises the toothing 16,
- a second toothed disk 4, disposed on the input shaft 2 on the driven side, which disk comprises the toothing 17, wherein the input and the output shafts 1, 2 are preferably disposed along one axis with a rotational center 8 and the toothings 16, 17 of the two toothed disks 3, 4 parallel to one another, with their tooth tips directed away from rotational center 8 of the rotational speed superposition device and oriented angled off with respect to the orthogonal to this rotational center 8 and mesh with the toothing 18 of the at least one further toothed wheel 5. The two toothed disks 3, 4 are here disposed at the front end and positioned at a slight distance from one another. Their toothings 16, 17 are oriented in the same direction with respect to one another and are aligned with one another in the meshing region of the further toothed wheel 5. In the preferred embodiment the toothed disks 3, 4 include toothings 16, 17 with different tooth numbers and reference circle radii T1, T2 differing from one another. By reference circle radius is to be understood the mean value between the radius to the tip of the toothing and the radius to the foot of the toothing in the center of the toothing width.

The angle $\alpha$ at which the toothings 16, 17 are angled off the orthogonal to the rotational center 8, is preferably between 10 and 30°. For reasons of symmetry the device is preferably laid out with two or three further toothed wheels 5.

As is evident in the Figures, the toothing of the at least one further toothed wheel 5 engages simultaneously the two toothings 16 and 17 of the two toothed disks 3 and 4.

The input shaft 1 is set into rotation by the steering wheel 120 and transmits its rotation to the first, driven-side toothed disk 3. Via the tooth flanks of the toothing 18 of the further toothed wheels 5 the rotational speed introduced by the steering wheel 120 into toothing 16 of the first, driven-side toothed disk 3 is transmitted onto toothing 17 of the second, output-side toothed disk 4 and therewith onto the output shaft 2. Provided that the auxiliary carrier 19 is fixed in its angular position with respect to body-stationary housing 11a, 11b, in the rotational speed superposition from the input shaft 1 onto the output shaft 2, the further toothed wheels 5 rotate about their own axis. The rotational output speed on the output shaft 2 is in this case determined by the rotational input speed on the input shaft 1 multiplied by the quotient of the number of teeth of toothing 16 of the first, driven-side toothed disk 3 divided by the number of teeth of toothing 17 of the second, output-side toothed disk 4.

When the auxiliary drive is driven, the rotational speed of its rotor 6 is transmitted onto the auxiliary carrier 19 and therein the further toothed wheels 5 are set into additional rotation about their own axis. The two toothed disks 3, 4 thereby are set into relative rotation with respect to one another which depends on the number of teeth of toothings 16, 17. Based on simple technical gearing considerations, a desired transmission ratio of the rotational speed of the auxiliary carrier 19 to the rotational speed of the output shaft at non-rotating input shaft can be laid out here. However, the fundamental gearing structure permits only one rotational speed reduction, which is of advantage since the utilized electric motor can thereby be operated at a higher rotational speed which is more favorable for electric motors.

The toothed disks 3, 4 can also be implemented as inner-toothed ring gear. In this case the further toothed wheel rolls off on this inner toothing 16, 17. However, the implementation with externally-toothed toothed disks 16, 17 and the rolling-off of the further toothed wheel 5 on this external toothing is preferred, since therewith the structure is simplified.

As an alternative to the solution depicted in the Figures the auxiliary drive can also be coupled into the rotational speed superposition device via a gearing, belt or chain drive. In this case the rotor as well as also only one single or, of course, also several of the further toothed wheels 5 can here also be set into rotation about their own axis. The auxiliary drive, instead of the preferred implementation as electronically commutated electric motor, can in this case also be implemented in very simple manner as a hydraulic or pneumatic drive due to the body-fixed disposition of its stator.

In this embodiment with especially few parts the carrier system is laid out as at least a two-part housing 11a, 11b, wherein the two housing halves 11a and 11b are so joined by bolts that the toothings of toothed disks 3, 4 and of the further toothed wheels 5 are free of play yet not tightly meshed, whereby a play compensation during the mounting of the rotational speed superposition device is attained. Axial positioning through appropriate tightening of the housing bolting 26 takes place under measuring of the corresponding angular plays between input shaft 1, output shaft 2 as well as rotor 6 and measuring correspondingly acting torques during the torsion of the input shaft 1, output shaft 2 as well as of rotor 6, wherein the torques should assume the most minimal values possible and the plays should not exceed predetermined values, for example 0.5 angular degrees.

The number of further toothed wheels 5 should be as small as possible, since in each tooth meshing of toothings 18 of the further toothed wheels 5 with toothings 16, 17 of the two toothed disks 3, 4 the orientation of the teeth of toothings 16, 17 must correspond to one another which the possible tooth number differences, and therewith possible transmission ratios of the device, restrict. Thus, for example with two further toothed wheels 5 the toothing 16 of the first toothed disk 3 can be laid out with 54 teeth and that of the second toothed disk 4 with 56 teeth, which leads to a transmission, of the reciprocal value derived from one minus the quotient of the number of teeth of the first toothed disk 3 divided by the number of teeth of the second toothed disk 4, to the result of 27 rotor revolutions per revolution of the output shaft 2 at non-rotating input shaft 1.

If a third further toothed wheel 5 is introduced, due to the correspondence, the tooth number difference must be 3 such that the transmission ratio now leads to 18 rotor revolutions per revolution of the output shaft 2 at non-rotating input shaft 1. The tooth number of the further toothed wheel 5 is not decisive for the dimensioning of the gear reduction ratio. However, the teeth must fit modularly into the teeth of the two toothed disks 3, 4. If more than one further toothed wheel 5 is utilized, it should advantageously be disposed on the rotor or on the auxiliary carrier 19 uniformly distributed over its turning circle in order to divide the acting forces uniformly. In this case in the dimensioning it must also be ensured that for the toothings 16, 17 of the two toothed disks 3, 4 the meshing with the toothed disks correspond with each of the further toothed wheels 5.

The preferred embodiment of the rotational speed superposition device comprises additionally a rotational speed or rotational angle measuring device 9 and a safety coupling 10.

The rotational speed measuring device 9 is used in order to detect or measure at least one of the rotational speeds of the input shaft 1, of the output shaft 2 and/or of the rotor 6 and to conduct it to the control apparatus 128 such that therefrom the actuation of the auxiliary drive or also other assemblies, not depicted here, in the motor vehicle, such as an antiblocking system is actuated.

The superposition gearing according to the invention can be laid out such that an at least partial self-restraint between input shaft 1 and output shaft 2 is attained. This means that in case of non-energized and unblocked rotor 6 of the auxiliary drive the rotational speed of the input shaft 1 is transmitted directly onto the rotational speed of the output shaft 2. Such couplings are attained through corresponding gear ratios. Yet it is frequently desirable to integrate a safety coupling or locking device.

The safety coupling 10 is formed very simply in the embodiment example since through the structure of the rotational speed superposition device a simple locking of the housing with the rotor of the auxiliary drive is sufficient to ensure the complete coupling of the rotational speed of the steering wheel 120 with the rotational speed of the output shaft 2 and consequently to ensure the complete control of the driver over the steering system. In the simplest case the locking is realized through a pin engaging into corresponding recesses on rotor 6. Through the transmission ratio between rotational output speed and rotational rotor speed the loadings of the locking are not very high such that it is even possible to produce the locking through a frictional closure. For reasons of safety, however, locking by form closure is preferred.

Consequently, in comparison only a low locking moment is required compared to the torque to be transmitted from the steering wheel to the input shaft. However, the requirements made of the strength of the locking mechanics are low due to the small requisite locking moment. Based on the high rotational speed transmission between rotor and output shaft, an uncontrolled torsion of the rotor for a large angular range, for example up to 30°, can, if required, be permitted until the locking snaps in place. The steering angle would in this case be only falsified, for example, by approximately 1°. As a consequence, the locking by means of form closure through the engagement of a pin into a bore can be formed simply and reliably. Due to the fundamentally nonhazardous large displacement angle of the rotor with respect to the housing, relatively few and large indentations at the circumference of the rotor can be provided which leads to constructionally simple formation feasibility.

The vehicle body-fixed disposition of the carrier system or of the housing 11a, 11b permits a very simple and failure-safe electrical connection of the system to the motor vehicle electronic circuitry. The locking device depicted here can also be disposed and actuated in simple manner. Thus, an hydraulic or an electro-hydraulic actuation can be simply produced as an alternative to the preferred electrical actuation.

Figure 6:
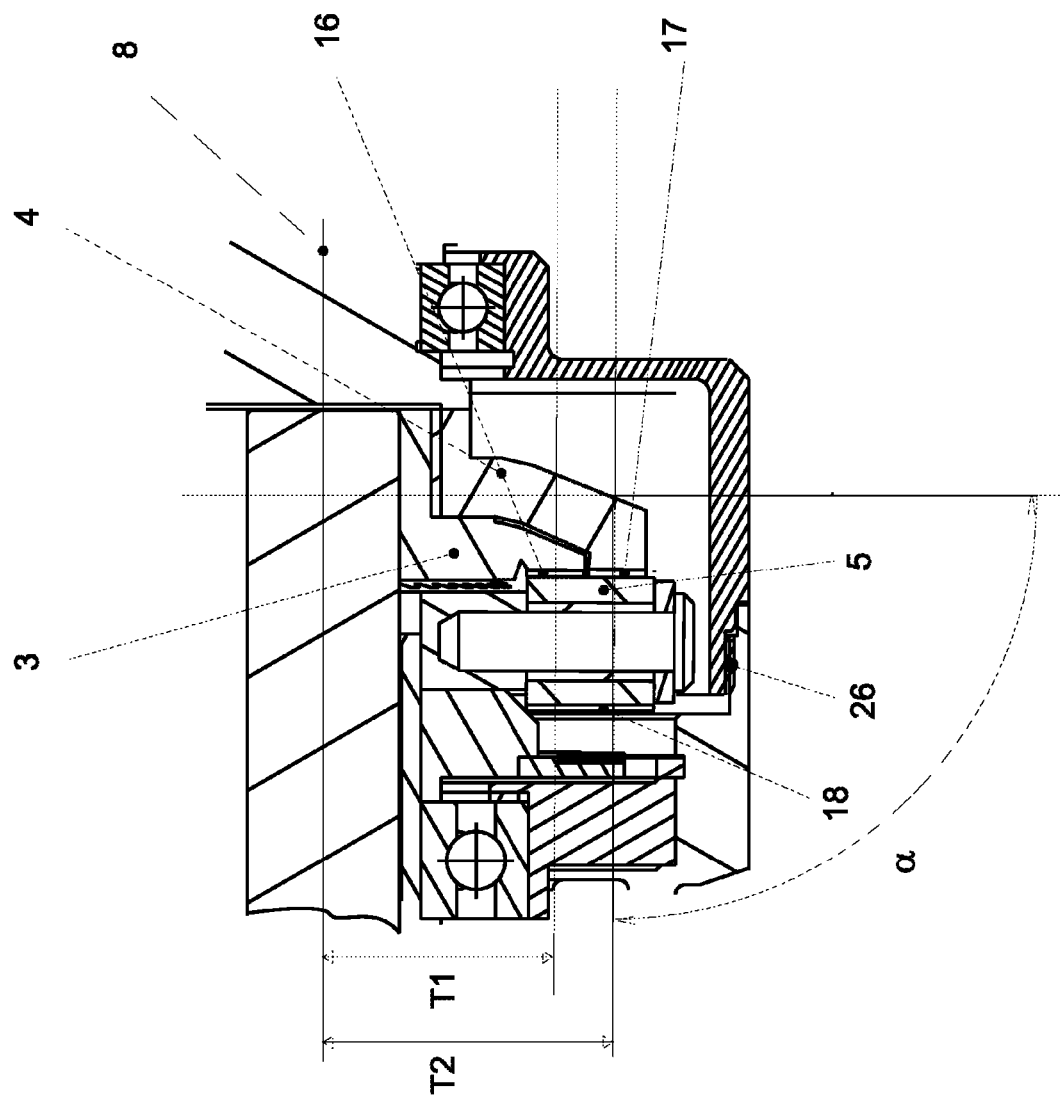

FIG. 7 depicts a further embodiment of the rotational speed superposition device. FIG. 6 depicts an enlarged segment analogous to that shown in FIG. 4 for this further embodiment of the rotational speed superposition device. In this example the toothings 16, 17 of the two toothed disks 3, 4 are disposed angled off by the angle α of 90 angular degrees with respect to the orthogonal to the rotational axis 8. Accordingly, the further toothed wheel 5 with its rotational axis is disposed orthogonally to the rotational axis 8. The function corresponds to the function depicted in the remaining Figures.

Figure 5:
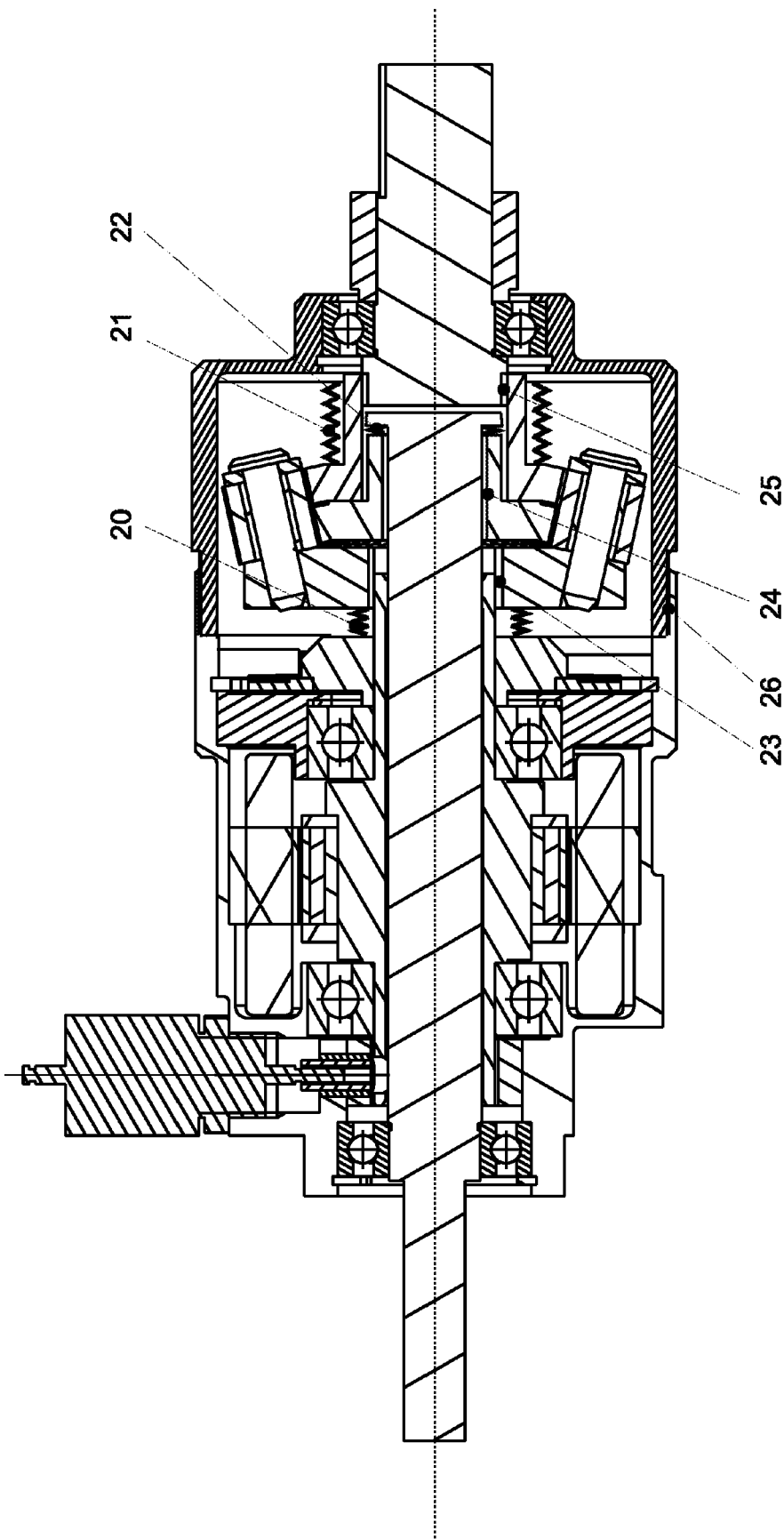

FIG. 5 depicts the rotational speed superposition device in an alternative embodiment with play compensation. The proposal for a solution shown here for the play compensation is also applicable to the variants shown in FIG. 6. Elastic or damping elements 20, 21, 22, in the simplest case helical springs, are here also utilizable, but also inserted rubber buffers, which press the toothings into the engagement and thereby compensate plays. For the toothed disks 3 and 4 as well as the further toothed wheels 5 to be pressed into engagement, the toothed disks 3, 4 are connected with the input shaft 1 or with the output shaft 2 torsion-tight but axially displaceable via the entrainment toothings 24 and 25, respectively. The auxiliary carrier 19 for the further toothed wheels 5 is correspondingly connected torsion-tight but axially displaceable with the rotor 6 of the auxiliary drive via the entrainment toothing 23.

Alternatively, only one or two of the elastic or damping elements can also be utilized and correspondingly only one or two entrainment toothings can be provided. In FIG. 5 the spectrum of feasibilities for a decrease and damping of play and/or noise damping is shown. It is also possible to combine elastic and damping elements by having one element include both functions or laying out one element as a pure spring while another element is laid out as a pure damper.

It is likewise possible to omit such elastic or damping elements and to attain absence of play during the mounting through appropriate axial adjustment and subsequent fastening of the toothed disks 3, 4 and of the auxiliary carrier 19, respectively.

It is here that a special advantage of this configuration introduced here is evident compared to solutions with classic planetary wheel gearings, in which such play compensation is in principle not possible. This advantage is attained primarily through the angled-off disposition of the toothings.

The disposition in angled-off form of the toothings further offers the advantage of producing the desired function of the rotational speed superposition with fewer toothed components and also with overall fewer and simpler to produce components. Through the angling-off the toothing 17 of the output-side toothed disk 4 has a greater mean diameter T2, which is often also referred to as reference circle diameter, than the toothing 16 of the driven-side toothed disk 3 with its reference circle diameter T1. The further toothed wheel 5 can thereby be implemented integrally with a continuous toothing and yet be brought into engagement with the different tooth numbers of the two toothed disks.

The superposition gearing can in all embodiments be implemented with different tooth forms. Helical gearings and special tooth contours for noise reduction and decrease of tolerance sensitivity are possible.

As already explained above, it is provided for different applications to integrate a safety coupling into the rotational speed superposition device. The task of this safety coupling comprises establishing the safe coupling between input shaft 1 and output shaft 2 in the event of error function, for example in the event of a sensor error, a software error or of power failure of the onboard voltage, which would lead correspondingly to an error in the actuation of the auxiliary drive. Apart from the solution already introduced above for such a safety coupling or also locking device 10, a further embodiment for a safety coupling with different variants is depicted in FIGS. 9 to 14. Additional advantages are gained due to this further development of the invention.

Figure 9:
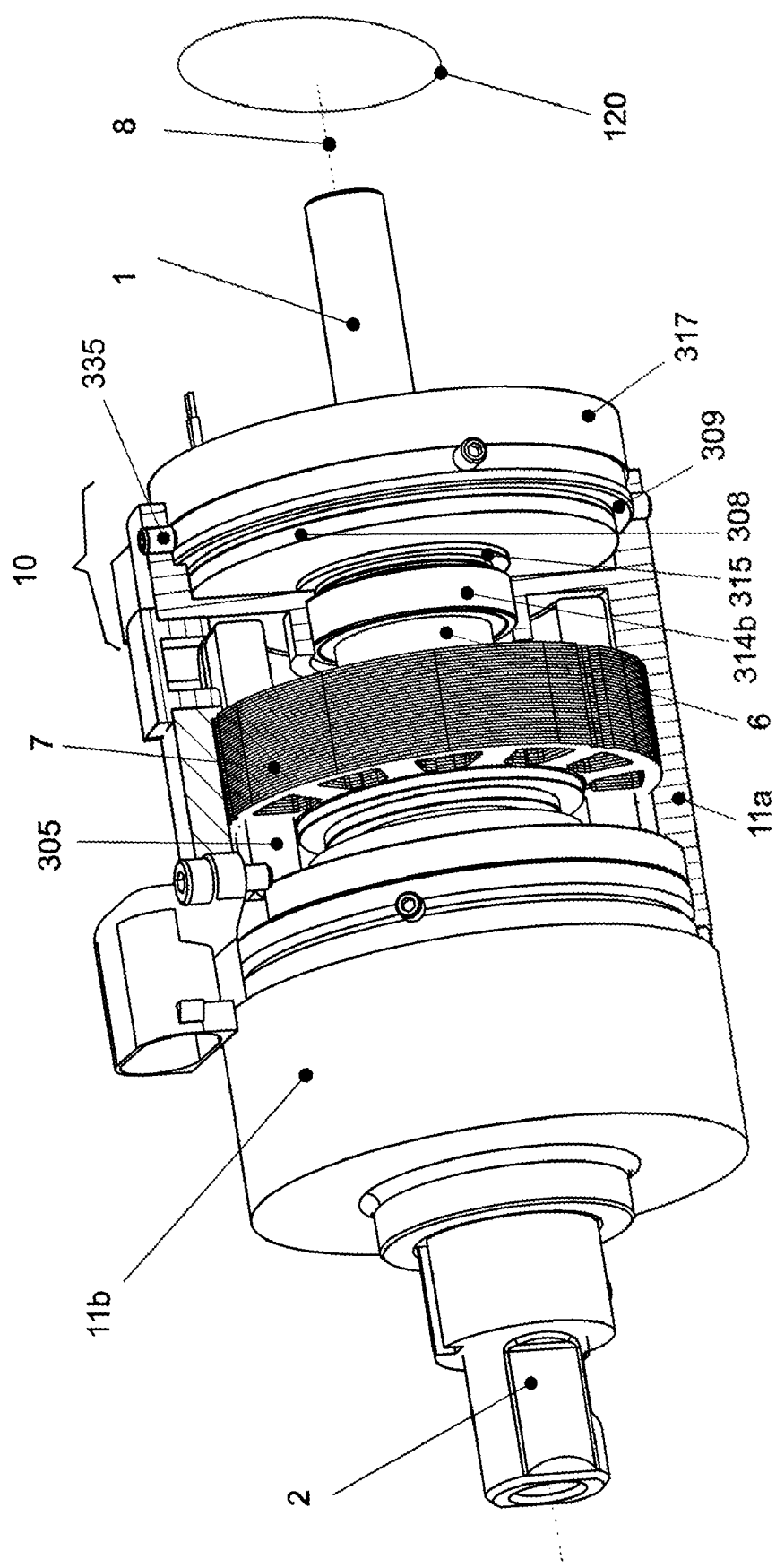
Figure 10:
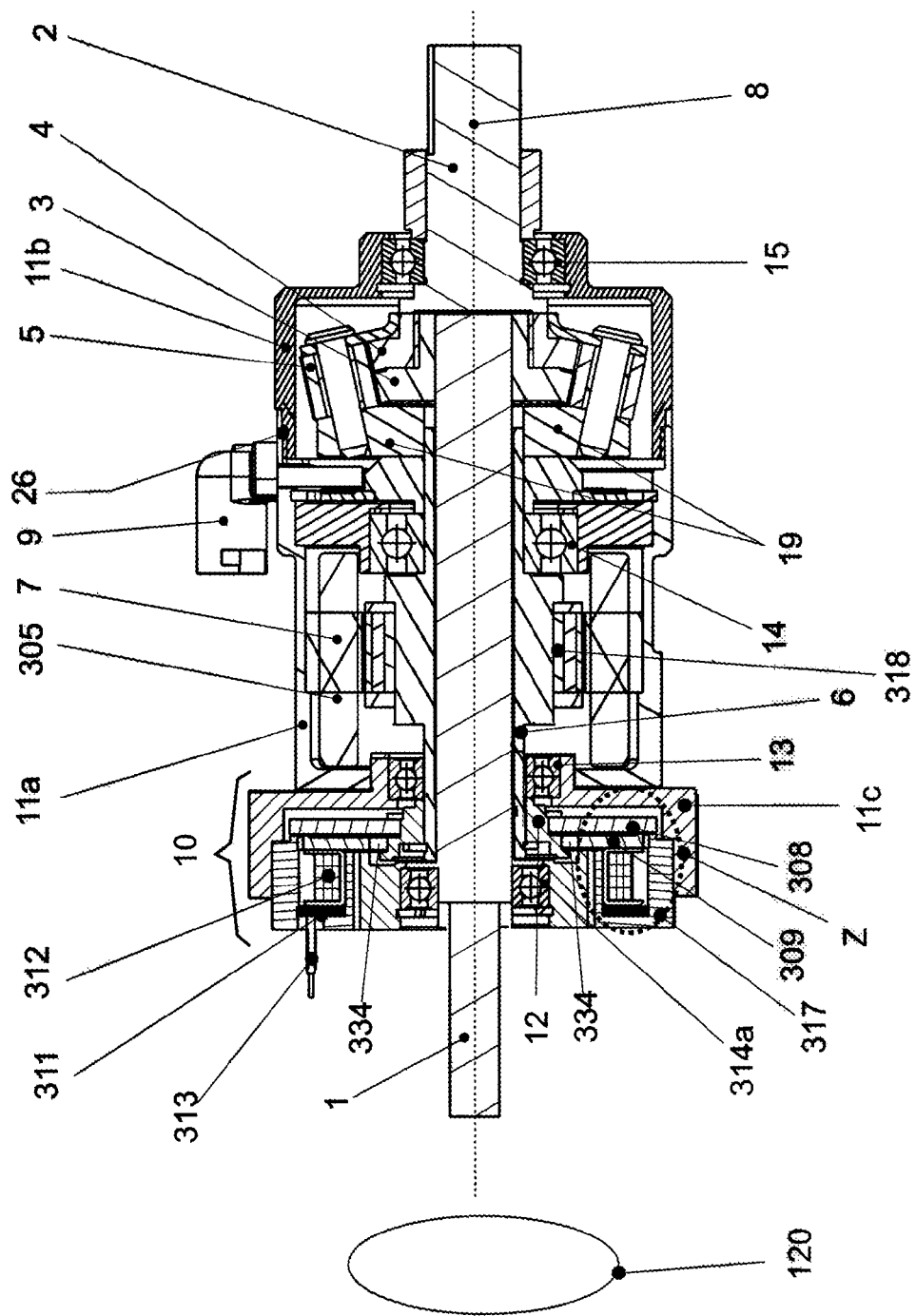

FIG. 9 depicts schematically and in three-dimensional view a rotational speed superposition device according to the invention combined with a preferred adjustable safety coupling configuration 10, with the arrangement being shown in FIG. 10 in cross section and further detail. According to the invention for the rotational speed superposition device for a motor vehicle steering system with an output shaft 2, which is oriented in the axial direction of the input shaft 1, a carrier system 11a, 11b, 11c which positions the output shaft 2 and the input shaft 1 such that it is at least partially rotatably bearing supported, an auxiliary drive 305, 6, 7 with a rotor 6 connected torsion-tight with a first gearing element 19, the auxiliary carrier 19, and an adjustable locking device 10 for the optional torsion-tight coupling between output shaft 2 and input shaft 1 is provided that the carrier system 11a, 11b, 11c is disposed torsion-tight relative to the vehicle body, the rotor of the auxiliary drive 305, 6, 7 encompasses coaxially the output shaft 2 and/or input shaft 1, the first gearing element 19 transmits with a rotational speed transmission less than 1 the rotational speed of the rotor 6 onto the rotational speed of the output shaft 2, and the rotor is torsion-tight connected with a ferromagnetic or permanent magnetic first contact element 308 concentrically encompassing the axial direction of the output shaft 2 and input shaft 1, wherein the torsion-tight coupling between output shaft 2 and input shaft 1 is attained through a frictional closure of the first contact element 308 with a second contact element 309, which is connected torsion-tight with the carrier system 11a, 11b, and the press-on force required for the frictional force is generated by a magnetic force and wherein at least one of the two contact elements 308, 309 is displaceable in the axial direction. At least one of the two contact elements 308, 309 can preferably be implemented in the form of a disk and/or in the form of a cone.

The input shaft 1 and output shaft 2 are oriented in one axis 8 with respect to one another.

In the depicted embodiment on the rotor 6 of the auxiliary drive 305, 6, 7 a coupling element 315 is disposed which carries the first contact disk 308 such that it is axially displaceable and transmits the torque. The rotor 6, coaxially encompassing the input shaft 1, of the auxiliary drive is rotatably bearing supported in a roller bearing 314b in carrier system 11a, 11b, 11c, which is here implemented as a housing. The elements of the locking device 10 can be contained in a separate subhousing 317 as an assembly, which is produced separately and mechanically connected with the carrier system 11a, 11b, 11c. This connection can be established simply via a bolting into inner threads, not shown here, of the carrier system 11 or via bolting 335.

The auxiliary drive 305, 6, 7 in the preferred case is laid out as an electric motor whose stator 7 is fixedly connected with the carrier system 11. Depending on the implementation of the gearing, the stator 7 encompasses coaxially the axis 8 of the input shaft 1 and/or output shaft 2. Stator 7 carries the stator windings 305. The rotor of the electric motor is equipped with permanent magnets and is set into rotation under the appropriate energizing of the stator windings 305. The electric motor is accordingly integrated completely into the rotational speed superposition device, whereby a highly compact and energy-efficient layout is attained. The motor is to be laid out so that it can be actuated such that it rotates in both rotational directions. Through the connection of the rotor with a gearing member of the superposition gearing, whose rotational speed is transmitted onto the output shaft 2 with a rotational speed transmission less than 1, the electric motor can be actuated with high rotational speed.

Transmission ratios of more than 1:20 or even more than 1:50 are here especially advantageous. This means more than 20 or 50, respectively, rotor rotations correspond to 1 rotation of the output shaft if the rotational speed of the input shaft has the value 0.

The contact elements 308, 309 are preferably produced as circular disks of steel or another ferromagnetic material. However, they can also be interrupted or apertured disks, which serves, for example, for better venting during the opening and closing of the two contact disks. In the embodiment example the first contact disk 308 is torsion-tightly yet axially displaceably connected with the rotor 6 of the power assisted booster 305, 6, 7 via a coupling element 315.

The magnetic press-on force is generated in the simplest case through a permanent magnet 311. The permanent magnet 311 can be implemented as a cylindrical disk whose axis coincides with the axis 8 of the input shaft 1 or output shaft 2. However, several discrete permanent magnets can also be disposed on a cylindrical disk. Furthermore, every possible implementation is denoted by the permanent magnet 311 for the sake of simplicity.

The first contact element 308 is attracted through the magnetic field of a permanent magnet 311 to the second contact element 309. The subhousing 317 as well as a corresponding armature implementation ensure the magnetic closure. The area pressure between the two contact elements 308, 309 serves as frictional closure. To improve the frictional force one or both of the contact elements 308, 309 can be coated with appropriate friction coatings. While a form-closure surface structure of the two contact disks 308, 309 would be obvious and conceivable, however, it entails a number of disadvantages. In particular, a locking is in this case no longer possible for each relative rotational angle between the two contact elements 308, 309. Increased wear must also be assumed. In particular a braking of a potentially still existing rotation of the rotor 6 is hardly possible. Nevertheless, such a solution can be desirable in the individual case.

In the event of locking the contact elements 308, 309 are in frictional contact with one another, whereby the rotor 6 is blocked with respect to the carrier structure 11. The rotor 6 is further connected with a first gearing element 19, the auxiliary carrier 19, which therewith is also blocked with respect to the carrier structure 11 disposed torsion-tight with respect to the vehicle body. The entire torque which is introduced into the input shaft 1 is transmitted to the output shaft 2. Accordingly, the rotational speed of the input shaft is transmitted onto a rotational speed at the output shaft. Therewith the function of the torsion-tight coupling between input shaft 1 and output shaft 2 is attained. This case is important for emergencies or also with the driving motor of the motor vehicle switched off. In this operating state the driver has the sole control over the steering of the driving direction and the steering wheel is mechanically coupled with the swivelled wheels. This is important in cases of lacking energy supply of the auxiliary drive, such as for example in the event of power failure, or also in malfunctions of the actuation of the auxiliary drive. For detecting such malfunctions, for example, sensors 9 can be integrated into the rotational speed superposition device, which make possible the monitoring of the different rotational speeds or rotational angles on input shaft 1, output shaft 2 and rotor 6.

In the case of unlocking in which the rotational speeds or rotational angles of the input shaft 1 and output shaft 2 are to be variable with respect to one another, the contact elements 308, 309 are moved out of frictional contact, preferably through a small distance between them. The auxiliary drive is simultaneously supplied with energy such that it assumes the supporting of the torque introduced by the input shaft 1. If needed, the rotor 6 is set into rotation by the auxiliary drive in order to attain corresponding rotational speed or rotational angle superposition between input shaft 1 and output shaft 2.

To increase safety it is especially advantageous if, in the event of an unlocking on failure of the energy supply at the auxiliary drive 305, 6, 7, switching into the case of locking, in which output shaft 2 and input shaft 1 are coupled torsion-tight, takes place quasi automatically. Additional currents, which effect the coupling, should not be required. This process, moreover, should take place such that it is as imperceptible for the driver as is possible.

For this purpose the unlocking should preferably be effected by a current flow, while without this current flow the system is automatically locked. In a further development of the invention this is attained thereby that the magnetic press-on force between the first and second contact element can be cancelled through an electrically actuated magnetic counterfield. In the simplest case this magnetic counterfield is generated by an encircling coil 312, which is actuated via an electric connection 313. In the embodiment example the coil 312 is disposed between the permanent magnet 311, which effects the magnetic press-on force, and the contact disk 309. If the coil 312 is appropriately energized, the magnetic circle between the permanent magnet 311 is closed such that onto the first contact disk 308 no or only a very low attractive force acts in the direction of the second contact disk 309. Therewith the frictional force between the two contact disks decreases such that the locking device 10 is unlocked. Upon a failure of the power supply of coil 312 the magnetic counterfield immediately collapses such that the magnetic force of the permanent magnet 311 acts directly on the contact disk 308 and attracts it to the contact disk 309.

Figure 14:
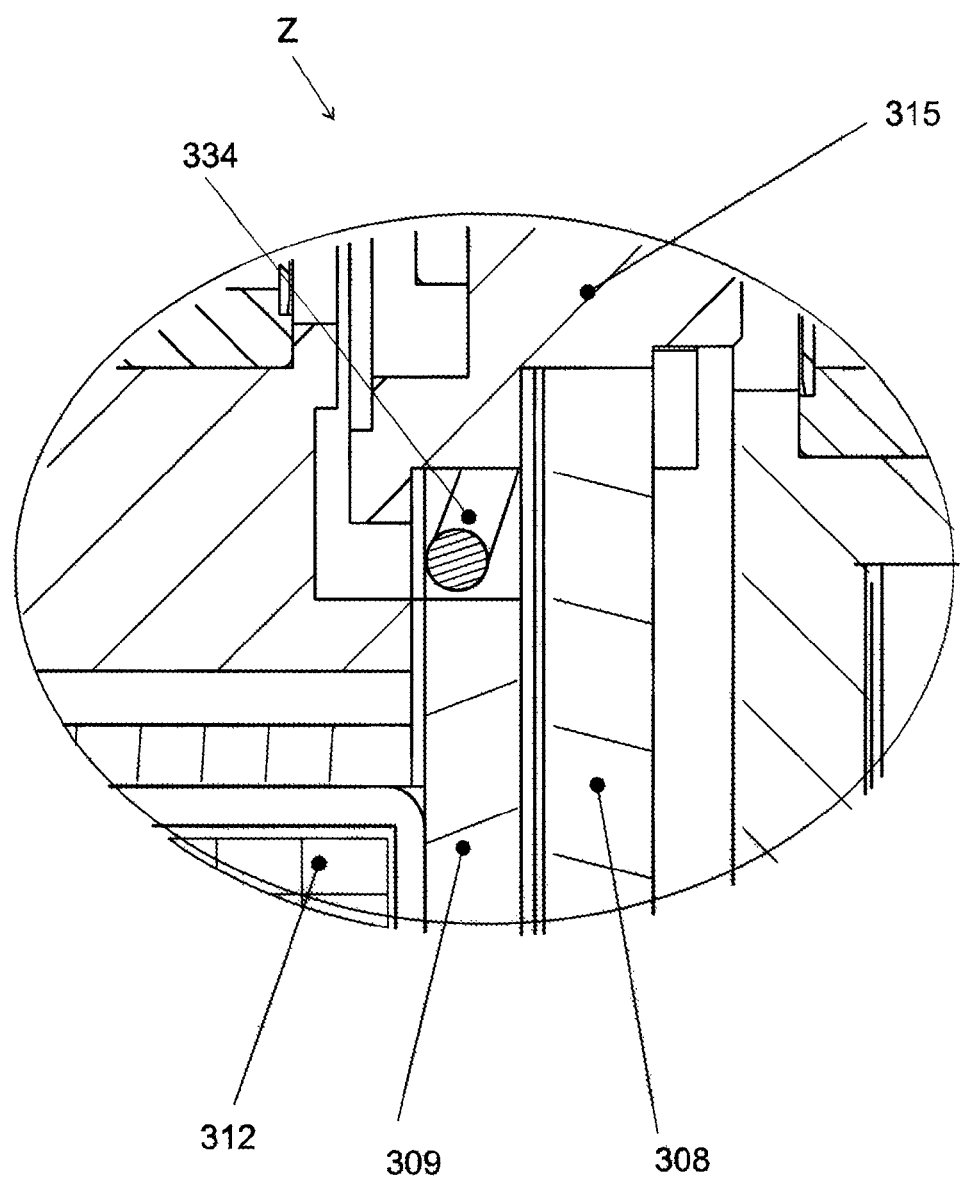

In a further development the energy expenditure for holding the unlocked state of the locking device 10 is to be lowered. For that purpose the locking device comprises a spring 334, whose force acts counter to the magnetic press-on force, as is also shown in FIG. 14. In the embodiment example the axially displaceable contact disk 308 is pushed away from the permanent magnet 311 by means of a spring 334. With increasing distance of the contact disk from the field of the permanent magnet 311, the force of attraction decreases such that the magnetic counterfield now only needs to be weaker in order to cancel its effect.

However, for locking the locking device 10 through the magnetic force of the permanent magnet 311 the spring force must be overcome. For this purpose in a further development of the invention the spring force is laid out under definition. In the preferred case the spring force is dimensioned such that the force acting onto the first axially movable contact disk 308 directed away from the other contact disk 309 is in the state, in which the first contact disk is raised, is in the range of slightly greater than zero up to 10% of the magnitude of the magnetic force of the magnetic field which generates the press-on force. For maintaining the unlocked state of the locking device 10 thereby only a very low power requirement is available for the magnetic counterfield. The reliable closing of the locking device is simultaneously ensured. As soon as the contact disks 308, 309 move toward one another, the magnetic force on the movable contact disk 308 increases such that the required high frictional force is generated. With the dimensioning of the spring the bouncing during impact of the two contact disks is decreased. The briefly minimally higher power requirement for unlocking the locking device 10 is more than compensated by the saving during the entire length of holding in the unlocked state.

The locking device 10 can very well and compactly be integrated into the rotational speed superposition device. For this purpose the rotor 6 is preferably, on the one hand, rotatably bearing supported in the carrier system 11 and the input shaft 1 is rotatably bearing supported in the part of the locking device 10 fixedly connected with the carrier system, which encompasses the second contact disk. It is especially advantageous to support the other end of the input shaft 1 directly in the output shaft 2.

With the aid of the rotational speed superposition device structured according to the above characteristics a rotational speed superposition device with a safety redundancy for the steering against failure of the onboard vehicle voltage or other breakdowns is provided, which very rapidly and securely establishes a mechanical coupling between the steering wheel and the steered wheels. In the event of a failure of the energy supply of the auxiliary drive 305, 6, 7 or another disturbance of the functions of the motor vehicle, the current flow for the operation of the magnetic counterfield for cancelling the magnetic press-on force is interrupted such that the first contact disk 308 is in frictional-closure contact with the second contact disk 309 with the magnetically generated press-on force.

Figure 11:
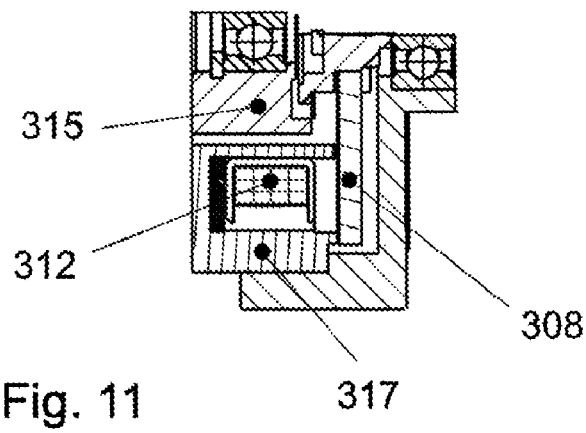
Figure 12:
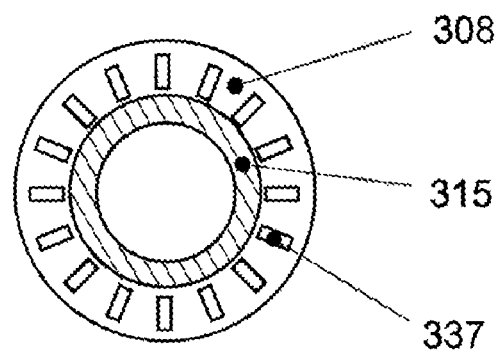
FIG. 12 and FIG. 13 depict two embodiments for the contact disk, FIG. 14 a detail view through the locking device according to segment Z from FIG. 10.
Figure 13:
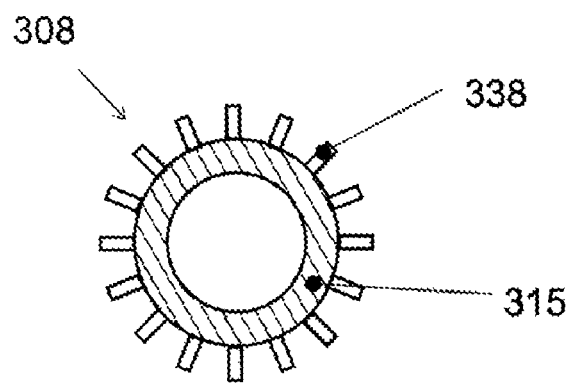

FIG. 11 depicts an alternative embodiment for the safety coupling, in which the contact disk 308 is brought directly into contact with the subhousing 317 implemented as a yoke. The second contact disk should here be seen as a component part of the subhousing 317.

In all embodiments the contact element 308 can be laid out as a cylindrical disk. For better venting during the closing of the two contact faces it is, however, of advantage to lay out the contact disk 308 with corresponding clearances 337 (cf. FIG. 12). Alternatively, a number of contact elements 338 (cf. FIG. 13) can also be connected directly with the coupling element 315. The form of the clearances 337 or the contact elements 338 of the contact disk 308 are to be adapted to the particular constructional conditions. It is important that a sufficient magnetic force of attraction is attained to the second contact element 309 or directly to the subhousing 317, which, on its surface directed toward the contact element 308, can itself have a corresponding frictional coating.

One and/or both contact elements can advantageously in all embodiments alternatively be disks and/or elements with area segments, which are developed with corresponding conical or arcuate surfaces. The contact face at the same diameter is thereby increased and a centering function can also be attained.

Even if in all embodiments roller bearings are shown, it is conceivable and possible to utilize friction bearings. While in general lower frictional values are attained with roller bearings, friction bearings are more cost-effective and require less installation space. A decision is made depending on the requirements of installation space and energy use for the auxiliary drive.

The rotational speed superposition device thus introduced is operated in motor vehicle steering systems in such manner that in the event of a failure of the energy supply of the auxiliary drive or another disturbance of the functions of the motor vehicle, the current flow for operating the magnetic counterfield for the cancellation of the magnetic press-on force is interrupted, such that the first contact disk 308 is in frictional-closure contact with the second contact disk 309 with the magnetically generated press-on force. A torsion-tight coupling between the input shaft 1 and the output shaft 2 is thereby attained directly. It is in this case desirable to establish the coupling within the shortest possible time and in such a manner that it is as imperceptible for the driver as possible. In addition to energy failure of the energy supply of the auxiliary drive system or in the motor vehicle, a sensor failure, a problem with the actuation or a software error or other errors are also conceivable as error cases. For example, through a simple cable break the measured value of the speed of the motor vehicle can no longer be transmitted correctly to the control of the superposition regulation. Therewith the control can no longer decide at which rotational speed superposition the device is to be operated. In such a case, which is readily detectable, sufficient energy is available to attain actively the torsion-tight coupling between output shaft 2 and input shaft 1.

In a preferred further development of the invention the coil for the magnetic counterfield, with which the magnetic field of the permanent magnet 311, which effects the locking device 10 for the optional torsion-tight coupling between output shaft 2 and input shaft 1, is cancelled, at least is for a time switched such that the magnetic contact pressing force between the two contact disks 308, 309 is increased. Thereby an accelerated closing of the locking device is effected. After the torsion-tight coupling of the output shaft 2 and the input shaft 1 is reached, the current feed of the coil 312 for the magnetic counterfield can be switched off.

The invention claimed is:

1. Rotational speed superposition device comprising:
    an input shaft (1) and an output shaft (2) disposed in the longitudinal direction with respect to one another,
    a carrier system (11a, 11b) fixed to the vehicle body, in which the input shaft (1) and the output shaft (2) are rotatably positioned such that they are at least partially bearing supported,
    an auxiliary drive (6, 7) with a stator (7) disposed on the carrier system (11a, 11b) and with a rotatably supported rotor (6) disposed axially parallel with respect to the input shaft (1),
    characterized in that the input shaft (1) is connected torsion-tight with a first toothed disk (3) and that the output shaft (2) is connected torsion-tight with a second toothed disk (4), and that on the rotor (6) at least one further toothed wheel (5) is disposed spaced apart from the rotational axis of the rotor (6) and rotatable about the input shaft (1) pivotable about its own axis, the toothing (18) of the further toothed wheel (5) engaging the two toothings (16, 17) of the first and of the second toothed disk (3, 4).

2. Rotational speed superposition device as claimed in claim 1 characterized in that the number of teeth of the two toothed disks (3, 4) are different.

3. Rotational speed superposition device as claimed in claim 2, characterized in that the different number of teeth of the two toothed disks (3, 4) is provided such that a transmission ratio is set which, each in a range of 10 to 50 rotations of the rotor (6), leads to one rotation of the output shaft (2).

4. Rotational speed superposition device as claimed in claim 1, characterized in that the reference circles ($T_1$ $T_2$) of the toothing (16, 17) of the two toothed disks (3, 4) are different.

5. Rotational speed superposition device as claimed in claim 1, characterized in that the axis of the input shaft (1) and the axis of the output shaft (2) are aligned.

6. Rotational speed superposition device as claimed in claim 1, characterized in that the two toothed disks (3, 4) are implemented as an internal gear with inner toothing (16, 17) and the further toothed wheel (5) rolls off on this inner toothing (16, 17).

7. Rotational speed superposition device as claimed in claim 1 characterized in that the two toothed disks (3, 4) are implemented as externally toothed wheels and the further toothed wheel (5) rolls off on this outer toothing (16, 17).

8. Rotational speed superposition device as claimed in claim 1, characterized in that the two toothed disks (3, 4) are disposed a front end positioned with respect to one another and their toothings (16, 17) are oriented extending in the same direction with respect to one another and are aligned in the engagement region of the further toothed wheel (5).

9. Rotational speed superposition device as claimed in claim 1, characterized in that at least two of the further toothed wheels (5) are disposed and mesh with the two toothed disks (3, 4) and these are preferably disposed on the rotor (6) such that they are distributed uniformly over its reference circle.

10. Rotational speed superposition device as claimed in claim 9, characterized in that the positions of the toothings (16, 17) of the two toothed disks correspond to one another at each engagement of a further toothed wheel (5).

11. Rotational speed superposition device as claimed in claim 1, characterized in that the toothings (16, 17) of the toothed disks (3, 4) are angled off with respect to an orthogonal of the rotational axis (8) at an angle $\alpha>0°$, preferably in the range of $\alpha=10°$ to $30°$.

12. Rotational speed superposition device as claimed in claim 1, characterized in that the toothings (16, 17) of the toothed disks (3, 4) are angled off with respect to an orthogonal of the rotational axis (8) at an angle $\alpha$ in the range of $\alpha=60°$ to $100°$.

13. Rotational speed superposition device as claimed in claim 1, characterized in that the device comprises elastic and/or damping means which hold the toothings (16, 17, 18) in engagement under prestress to attain a play compensation and/or noise damping.

14. Rotational speed superposition device as claimed in claim 1, characterized in that the driving and driven function of the input shaft (1) is exchanged with the output shaft (2).

15. Rotational speed superposition device as claimed in claim 1, characterized in that the carrier system (11a, 11b) is implemented as a housing.

16. Rotational speed superposition device as claimed in claim 1, characterized in that it is disposed in a steering system for a motor vehicle.

17. Rotational speed superposition device as claimed in claim 1, characterized in that rotor (6) and stator (7) of the auxiliary drive are disposed such that they are oriented coaxially with the input shaft (1) and output shaft (2).

18. Rotational speed superposition device as claimed in claim 1, characterized in that the carrier system rotates (11a, 11b) neither with the input shaft (1) nor with the output shaft (2) nor with the rotor (6).

19. Rotational speed superposition device as claimed in claim 1, characterized in that the device includes a locking device (10) which, in the event of malfunction locks the rotor (6) torsion-tight with the stator (7) and/or the carrier system (11a, 11b).

20. Rotational speed superposition device as claimed in claim 19, characterized in that the rotor (6) is connected torsion-tight with a ferromagnetic or permanent magnetic first contact element (308) concentrically encompassing the axial direction of the output shaft (2) and input shaft (1), wherein the optionally torsion-tight coupling between output shaft (2) and input shaft (1) is attainable through frictional closure of the first contact element (308) with a second contact element (309), which is connected torsion-tight with the carrier system (11a, 11b), and a press-on force required for the friction force is generated by a magnetic force and wherein at least one of the two contact elements (308, 309) is displaceable in the axial direction.

21. Rotational speed superposition device as claimed in claim 20, characterized in that at least one of the contact elements (308, 309) is implemented in the form of a disk and/or cone.

* * * * *